3,220,850
PROCESS FOR PREPARING BAKED GOODS UTILIZING DIHYDROXYACETONE TO ENHANCE BROWNING
David Livingstone Kirk, Somerset, N.J., assignor to Colgate-Palmolive Company, New York, N.Y., a corporation of Delaware
No Drawing. Filed Jan. 22, 1962, Ser. No. 167,907
13 Claims. (Cl. 99—90)

This invention relates to food. More particularly, this invention relates to a process for browning food and to novel food preparations. This invention is also concerned with the enhanced manifestation of desirable browning during the cooking process, and with novel baking preparations such as pre-packaged baking mixes for muffins, pie crusts, biscuits, pastries and the like.

The "browning reaction" occurring in foods has long been the subject of speculation and investigation. Often the incidence of browning in foods is most undesirable as, for example, in the enzymatic browning of fruits, meats and milk products upon lengthy storage and/or upon exposure to moisture and warm temperatures. However, the browning of foods during cooking can be a desirable occurrence. In this regard, the browning reaction will often produce (and indeed may be necessary to) certain agreeable odors, flavors and colors, during and after the cooking process, as for example, in the brown color of the crust of flour-based baked products or in the browned skin of the roasted or barbecued fowl.

Browning of foods is extremely complex and is not well understood. Various theories have been advanced in explanation of this phenomena. It is known for example, that moisture content, temperature and pH value will affect the enzymatic browning of foods. It is also known that certain materials, such as sulfur dioxide and formaldehyde will inhibit browning while the presence of certain metals, such as copper and iron, will promote the reaction. However, the reasons for and the explanations of the reaction remain largely speculative and conjectural.

One widely advanced theory for the browning of foods during the cooking process is that, depending on conditions and the type of ingredients involved, reducing groups of sugars in foods react with amino groups, such as those in proteins or amino acids, in foods to produce a wide variety of dark-colored substances. However, this theory lacks complete confirmation and, at any rate, does not provide the chef, baker or housewife with the means of controlling adequately the browning reaction during the cooking process.

According to this invention, a process for browning foods comprises adding, to a food capable of being browned by cooking, dihydroxyacetone in an amount effective to increase visible browning of the food.

The addition of dihydroxyacetone may be accomplished in a wide variety of ways. For example, it may be thoroughly admixed, i.e., incorporated or blended, in solid or crystalline form, with an uncooked, brownable food preparation such as a pre-packaged, flour-based baking mix. Alternatively, it can be added, in solution form, to provide all or part of the moisture used in the preparation of the flour-based baking mixtures. In this regard, the browning additive of this invention can be diluted in either a non-aqueous or aqueous solvent. Mixing can be accomplished by manual, mechanical or other suitable means.

The dihydroxyacetone can also be brushed or sprayed on the surface of the food in a solution, or, when in crystalline form, can be springled on the surface of the food, either prior to, during or after the cooking process. Indeed, the dihydroxyacetone can be included in a seasoning dispenser as part of the seasoning salt contained therein and hence can be sprinkled on the food conjointly therewith. Similarly, the dihydroxyacetone can also be included in gravy or cooking oils as an additive thereto and hence can be introduced into the cooking process along with such gravy or cooking oils. In this regard, the additive will also effect an enhanced browning of the gravy thus adding to the appetizing appearance thereof. It is to be understood, however, that any suitable means of introducing amounts of dihydroxyacetone effective to enhance browning can be employed and are within the scope of this invention.

The process of this invention is directed to treating those foods which can be browned by cooking and more particularly to treating those foods where enhanced browning is desired. Particularly suitable for use in the practice of this invention are flour-containing foods such as bread and flour-based baking mixes of all kinds, e.g., muffins, pie crusts, biscuits and the like; and those meats, including fish and bowl, where the incidence of browning during the cooking process is desirable for maximum attractiveness.

Similarly, while the process of this invention is useful in conjunction with conventional cooking techniques, particularly since controlled augmentation of the browning reaction can now be effected, it is particularly appreciable to "electronic" oven cooking of the aforementioned baking mixes and meats. In this regard, it should be noted that "electronic" ovens, as now utilized, may contain both radiant and microwave (e.g., dielectric) heating sources. This combination is employed even though microwave heating is sufficient in itself to effect the actual cooking of the food. However, cooking with microwaves or dielectric heating does not produce a brown food. Therefore, since browning imparts at least a subjective appeal to the food, the conventional radiant heating element is included to effect browning of the food. This increases both cost and heating time to a point considerably over that which would be required if the microwave unit were employed solely. However, with the present invention, the browning of the foods can now be effected in an "electronic" oven without the addition of a conventional heating unit. In this regard, the addition of effective amounts of dihydroxyacetone can be accomplished before "electronic" cooking commences. However, a particularly attractive feature of this invention comprises adding the dihydroxyacetone after the completion of the "electronic" cooking, thus imparting to the "cooked" product the desirable browning essential to food appreciation.

This invention also applies to fresh foods or foods which have been processed or treated by any means including dehydration, freezing, canning, radiation or heat, sterilized or pasteurized and the like.

It is to be understood that the term "cooking" primarily entails those processes normal to the production of browned foods by the application of heat, i.e., baking, roasting, frying, barbecuing and the like.

The scope of this invention also envisions a wide variety of novel food preparations. These preparations, for the practice of this invention, comprise the combination of brownable foods with externally-supplied amounts of dihydroxyacetone sufficient to brown the foods, i.e., those amounts sufficient to cause enhanced browning under the process conditions. A particularly preferred embodiment of this invention is a food preparation comprising a bakable composition such as a pre-packaged baking mix as described heretofore, and externally supplied dihydroxyacetone in an amount sufficient to increase visible browning. By "externally supplied" is meant applying or supplying dihydroxyacetone to food, in any means or manner such as mixing, incorporating, brushing, blending, sprinkling and the like.

It should be noted that an undesirable feature of present-day pre-packaged baking mixes is that they do not ordinarily "brown" when baked, to the extent deemed most pleasing. This undesirable feature is alleviated by the practice of this invention.

Illustrative of the baking mixes useful in the practice of this invention are the conventional flour-sugar based mixes readily obtainable in the commercial market. By "flour" is meant any product usually made either wholly or in part from a ground cereal or grain. By "baked" is included any of the usual processes of applying dry heat to render the flour product suitable for eating. The invention, therefore, may be used with all forms of pastries, cakes, breads, rolls, and the like requiring browning and the term "baking mix" is intended to refer to any of the mixes used to prepare these and similar products. In breads the baking mix ordinarily consists of flour, yeast, yeast food, water, sugar, milk powder, shortening, salt and, in some cases, flavorings. In cakes the baking mix usually comprises flour, sugar, shortening, milk powder, salt, water, eggs, flavorings and colorings. In cookies the baking mix similarly consists of sugar, shortenings, eggs, flavoring, water, flour, salt, syrup and the like. Other combinations of the same or similar ingredients are employed in all bakery goods.

As indicated previously, the dihydroxyacetone may be added at almost any point prior to the baking process. In this regard, it can be also added to pre-leavened dough or batter. The term "dough" is used herein in connection with those baked goods which are leavened principally by biological action, such as breads, rolls and yeast raised sweet goods. On the other hand, the term "batter" is herein associated with baked goods principally leavened by mechanical and/or chemical action, such as pound, yellow and white cakes. This invention may apply also to unleavened baked goods.

Similarly, the scope of this invention includes seasoning salt mixtures, pre-packaged gravy or cooking oils, and the like, which contain effective amounts of dihydroxyacetone.

In the practice of this invention, the "effective," i.e., "browning," amount of the dihydroxyacetone added to the "brownable" food is dependent on the time and manner of introduction of the browning additive, the degree of browning required or desired, the food being prepared, and the method of preparation of the final food product. For example, in the case of pre-packaged baking mixes, the amount of dihydroxyacetone added thereto for the purpose of enhancing browning, can vary, broadly speaking, from about 0.1 to about 2.0 percent by weight of the total dry weight of the preparation. However, in these dry baking mixtures a dihydroxyacetone concentration of 0.2 percent to 1.0 percent by weight is preferred. It is to be understood, moreover, that optimal concentrations will vary within the latter preferred range depending on the type of flour-based mix being employed and the other variables mentioned previously. Thus, for example, a concentration of 0.6 percent by weight of dihydroxyacetone was found to give "optimal" browning with specific pie crust mixes. However, for corn muffins, baking powder biscuits and the like, the lighter hue afforded by a concentration of 0.4 percent dihydroxyacetone was found to be preferable.

On the other hand, when the dihydroxyacetone is applied to the surface of the food prior to or during the cooking process regardless of whether it is added in conjunction with a seasoning salt, gravy or the like or as a solution, or is brushed, or sprinkled, or sprayed thereon, the effective amount of dihydroxyacetone cannot be determined except by visual inspection, subsequent to the application to the food being treated of each increment of the dihydroxyacetone. When topically applied, a solution or mixture having a concentration of from about 1 to about 10 percent by weight of dihydroxyacetone is preferred. However, for baking powder biscuits, surface-applied concentrations of from 0.1 to 20 percent by weight of dihydroxyacetone have been found to give good results, with a concentration of 2 to 5 percent by weight being preferred.

It is to be understood that the determination of "optimal" browning is at best, a subjective visual evaluation. Hence, the concentrations given above can be varied, and the brown effected thereby can be controlled by the baker, chef or cook according to preference. Accordingly, the subject invention is not to be construed as being limited to the given concentration ranges.

It is to be noted that the degree of browning during a normal cooking process is ordinarily a function of the temperature of the surface of food being cooked, i.e. higher temperatures will result in a greater degree of browning and vice versa. However, the food preparations of the present invention will brown at lower temperature than heretofore experienced or, if ordinary cooking temperatures are employed, will brown at a faster rate. It is to be emphasized that the browning effected by the process of the present invention occurs independently of any natural browning which may or may not occur during a cooking process and has no relation to the degree of cooking or the edibility of the food.

The practice of the invention may be further indicated by purely illustrative specific embodiments which follow:

*Example I*

A quantity (28 grams) of a commercial pie crust mix containing flour, shortening, salt, baking powder, and a rancidity preservative was placed in an electrically heated oven and baked at 350° F. As a control which is not illustrative of the invention. Similar quantities of the pie crust mix were separately admixed respectively with 10, 5, 2, 1, 0.8, 0.6, 0.4, 0.2, 0.1 and 0.01 percent by weight of dihydroxyacetone based on the weight of the dry mix ingredients, placed in the same oven and also baked at 350° F. for identical lengths of time as the control, at which time all the samples were thoroughly cooked. At the conclusion of baking, visual inspection of the baked pie crusts clearly indicated that those pie crusts which had been prepared from baking mixes which contained amounts of dihydroxyacetone of from 0.2 to 1.0 weight percent were perceptibly browner and, generally speaking, more pleasing in appearance than the control. In this regard, it was also determined that a pie crust mix containing a concentration of 0.6 weight percent dihydroxyacetone resulted, upon baking, in a pie crust having the most desirable brownish hue. However, baking of the pie crust mixes containing concentrations of 2 weight percent or more dihydroxyacetone, produced baked goods too dark and hence "unpalatable" in appearance. On the other hand, the use of between 0.1 weight percent and 0.2 weight of dihydroxyacetone imparted only a slight improvement in color to the baked goods while the use of below 0.1 weight percent thereof bestowed no appreciable or perceptible color change on the pie crusts.

*Examples II and III*

In like manner quantities (in 28 gram samples) of a commercial corn muffin mix containing degerminated yellow corn meal, flour, sugar, shortening, baking powder, salt and a preservative, and a commercial baking powder biscuit mix containing flour, shortening, leavening, nonfat dry milk, dextrose, salt and a preservative were baked containing the same various concentrations of dihydroxyacetone indicated above. The results obtained paralleled those obtained with the pie crust mix, although corn muffin or biscuit mixes containing 0.2 or 0.4 weight percent dihydroxyacetone were found to be most preferable since they resulted, upon baking, in baked goods exhibiting the most desirable brownish hue for such goods.

Example IV

Aqueous solutions of 20, 10, 5, 2, 1 and 0.1 weight percent of dihydroxyacetone were brushed on the surface of one batch of pastries prior to baking and on the surface of a second batch during baking. A perceptibly increased browning was noted in both instances in comparison to control pastries from each of the same batches which were baked without having had any dihydroxyacetone added thereto. This manner of application was found to be particularly effective for baking powder biscuits but less effective with pie crusts. In this regard, solutions of between 2 to 5 percent by weight dihydroxyacetone were found to give the best color to the muffin or biscuit or baked good.

Example V

Following the procedure substantially as outlined in Example IV, a sirloin steak was contacted with aqueous solutions of dihydroxyacetone and placed in a microwave cooking unit in the absence of radiant heating means and cooked to completion. A control steak was similarly placed in another microwave cooking unit, also in the absence of radiant heating means and also cooked to completion. The dihydroxyacetone-contacted cooked steak was perceptibly browner and more pleasing in appearance than the "control" steak.

In like manner, other brownable foods such as fowls of all kinds, breads, doughs, and meats can be contacted, by any suitable means as indicated previously, with dihydroxyacetone and comparable results will be obtained.

It is to be understood that the invention is not limited to the specific embodiments described above. Various modifications can be made in the process and in the inventive preparations without departing from the spirit or scope of the invention.

What is claimed is:

1. A process for the improvement of the browning characteristics of foods which comprises adding, to a food capable of being browned by cooking, dihydroxyacetone in an amount effective to increase visible browning of the food and heating said food to a temperature up to and including that of cooking.

2. A process for the improvement of the browning characteristics of foods which comprises applying topically to the surface of a food capable of being browned by cooking, a preparation having a dihydroxyacetone concentration of between 0.1 and 20 percent by weight, said preparation being applied in an amount effective to increase visible browning of the food and heating said food to a temperature up to and including that of cooking.

3. A process for the preparation of baked goods, which comprises admixing dihydroxyacetone with a baking mix, the amount of dihydroxyacetone admixed being of the order of between 0.1% and 2.0% by weight of said baking mix, on a dry basis, adding sufficient amount of suitable liquids to form the desired product and thereafter baking the product obtained.

4. A process according to claim 3, wherein the amount of dihydroxyacetone is of the order of between 0.2% and 1% by weight of the dry weight of said mix.

5. A process according to claim 3, in which a baking mix for making bread is employed.

6. A process for the improvement of the browning characteristics of bread which comprises adding to bread, dihydroxyacetone in an amount effective to increase visible browning of the bread and heating said bread to a temperature up to and including that of baking.

7. A process for the improvement of the browning characteristics of foods cooked by microwaves which comprises, adding to a food to be cooked by microwaves, dihydroxyacetone in an amount effective to increase visible browning of the food, and thereafter microwave cooking said food in the absence of radiant heating elements.

8. A process for improving the browning characteristics of foods cooked by microwaves which comprises adding to said food cooked by microwaves, dihydroxyacetone in an amount effective to increase visible browning of the food while said food is still hot from said cooking.

9. As an article of manufacture, a package containing a flour-based baking mix and an amount of dihydroxyacetone sufficient to cause the browning of the baking mix during baking, said dihydroxyacetone being thoroughly dispersed throughout said baking mix.

10. A culinary preparation comprising a mixture of a baking mix and dihydroxyacetone in an amount sufficient to enhance the browning of the culinary preparation during a subsequent baking process, said dihydroxyacetone being thoroughly dispersed throughout said baking mix.

11. A preparation according to claim 10 in which a baking mix for making bread is employed.

12. A preparation according to claim 10 wherein the dihydroxyacetone is present in an amount of from about 0.1 to about 2.0 by weight of the dry ingredients of the baking mix.

13. A preparation according to claim 10 wherein the dihydroxyacetone is present in an amount of from 0.2% to 1.0% by weight of the dry ingredients of the baking mix.

References Cited by the Examiner

UNITED STATES PATENTS 2,895,828   7/1959   Kamide _____ 99—221 XR

FOREIGN PATENTS 1,251   1885   Great Britain.
5,169   1889   Great Britain.

OTHER REFERENCES

"Food, Drug, Cosmetic Law Reports," 1960, Commerce Clearing House, Inc., page 1308.

"Cassell's Dictionary of Cookery," Cassell, Petter, Galpin & Co., New York, page 259.

Blau et al., "Archives of Dermatology," vol. 82, pages 69–501—70–502, 1960.

A. LOUIS MONACELL, *Primary Examiner.*

BEATRICE H. STRIZAK, *Examiner.*